[12] United States Patent  
Song et al.

(10) Patent No.: US 7,577,066 B1  
(45) Date of Patent: Aug. 18, 2009

(54) METHOD AND APPARATUS FOR PROVIDING HIGH SPEED RECORDING ON AN OPTICAL MEDIUM

(75) Inventors: Hubert Song, Sunnyvale, CA (US); Akio Tanaka, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 577 days.

(21) Appl. No.: 11/292,772

(22) Filed: Dec. 2, 2005

Related U.S. Application Data

(62) Division of application No. 10/138,689, filed on May 2, 2002, now abandoned.

(51) Int. Cl.
*G11B 7/00* (2006.01)

(52) U.S. Cl. ............... 369/47.36; 369/47.3; 369/59.14; 369/44.29

(58) Field of Classification Search ............... None
See application file for complete search history.

(56) References Cited

U.S. PATENT DOCUMENTS

| | | | |
|---|---|---|---|
| 5,444,687 A | 8/1995 | Okumura | |
| 5,691,967 A | 11/1997 | Ando | |
| 5,883,866 A * | 3/1999 | Shimizume et al. | 369/47.41 |
| 5,956,308 A | 9/1999 | Akahira et al. | |
| 6,055,219 A * | 4/2000 | Ho et al. | 369/53.29 |
| 6,125,089 A | 9/2000 | Shigemori | |
| 6,175,542 B1 | 1/2001 | Okada et al. | |
| 6,201,773 B1 | 3/2001 | Aoki | |
| 6,236,343 B1 | 5/2001 | Patapoutian | |
| 6,246,649 B1 | 6/2001 | Ohta et al. | |
| 6,266,318 B1 | 7/2001 | Honda et al. | |
| 6,292,458 B1 | 9/2001 | Eguchi et al. | |
| 6,298,021 B2 | 10/2001 | Aoki | |
| 6,333,903 B1 | 12/2001 | Suzuki | |
| 6,337,551 B1 | 1/2002 | Hsu et al. | |
| 6,519,217 B1 | 2/2003 | Kawashima et al. | |
| 6,522,608 B1 | 2/2003 | Kuroda | |
| 6,714,501 B2 | 3/2004 | Eom | |
| 6,775,211 B1 | 8/2004 | Tsukhashi | |
| 6,909,678 B2 | 6/2005 | Morishima | |
| 7,099,248 B2 * | 8/2006 | Jin | 369/47.48 |
| 2003/0206501 A1 | 11/2003 | Song et al. | |

* cited by examiner

*Primary Examiner*—Muhammad N. Edun
(74) *Attorney, Agent, or Firm*—Darby & Darby PC; John W. Branch

(57) ABSTRACT

A system and method for controlling the position of an optical head of a disc during high speed recording. In one embodiment of the method, an optical disc has a plurality of tracks. The method comprises implementing CLV recording by said optical drive, determining a wobble signal based on address information contained in said plurality of tracks of said optical disk and determining a wobble clock signal based on said wobble signal. The method further comprises decoding said wobble clock signal by a decoder, said decoder to provide a sync clock signal to an encoder loop circuit, said sync clock signal based on said wobble clock signal generating an encoder clock signal using said encoder loop circuit. In addition, the method comprises comparing said sync clock signal to said encoder clock signal to provide a position command to position the optical head of said optical drive.

20 Claims, 3 Drawing Sheets

METHOD AND APPARATUS FOR PROVIDING HIGH SPEED RECORDING ON AN OPTICAL MEDIUM

This application is a divisional patent application of related U.S. parent patent application Ser. No. 10/138,689 filed May 2, 2002 now abandoned titled "Method and Apparatus For Providing High Speed Recording On An Optical Medium".

BACKGROUND OF THE INVENTION

1. Field of the Invention

The present invention relates in general to optical disk storage systems and more particularly, to a method and apparatus for providing high speed optical disk recording.

2. Description of the Related Art

In recent years, optical disk devices have been used to record or reproduce large amounts of data. Optical disks are storage mediums from which data is read and to which data is written by laser. Each optical disk can store a large amount of data, typically in the order of 600-700 Mbytes. Such optical disk devices are under active technical developments for achieving higher recording density.

There are generally two methods of controlling the rotating speed of an optical speed. The first is constant linear velocity (CLV) recording, in which constant linear velocity is provided during recording by varying the speed of the spindle motor when recording proceeds from the inner to the outer diameter of the disk. The second is constant angular velocity (CAV) recording, in which constant angular velocity is provided during recording, while changing the frequency of data recording when recording proceeds from the inner to the outer diameter of the disk.

Current writable optical disks include spiral-shaped grooves in the dye coated layer (on the disk) that is sensitive to laser beams. The groove is not a perfect spiral, but wobbled in order to obtain motor control and timing information. Recording is implemented in the groove by locally heating up the sensitive layer with a laser spot. The laser output is modulated with the information to be recorded. The parts of the disc that were heated up during recording show a reflection decrease after recording and are called pits. The encoded Audio or Data information is stored in the length of these pits and in the distances between them. These lengths and distances only take discrete values.

The data synchronization and address information for the disk is provided through a signal typically referred to as a wobble signal. The wobble signal is typically a frequency modulated signal with bi-phase coded address information called Absolute Time in Pre-Groove (ATIP).

In CLV recording, the motor speed at the inner diameter is typically high, and gradually decreases as the optical head moves toward the outer diameter. In CAV recording, the spindle motor operates at a constant speed, but the data recording frequency varies as the optical head moves from the inner diameter to the outer diameter of the disk. The recording speed in optical disk recording is typically limited due to two factors. The first arises due to mechanical limitations in providing maximum rotational speed at the inner diameter. The second arises due to limitations in electronic data recording rate at the outer diameter.

To increase the speed of writing on optical disks, some drives utilize a Zoned CLV recording in which the disc is divided into a few zones. In a given zone, the CLV speed, or the data rate is constant while rotational speed decreases. At the beginning of each zone, the rotational speed is the same and thus the method utilizes the maximum mechanical speed limitation. However, as the CLV recording speed, or the data rate increases, it becomes increasingly difficult for the servo loop to keep the recorded data in synchronism with the ATIP due to electromechanical limitations. In addition, the Zoned CLV recording requires stopping the recording at the zone boundary and going back to re-link the recorded segment of the previous zone. Similarly, as the CAV recording speed increases, it also becomes increasingly difficult for the electronic circuits to keep up the data rate and may reach the data rate limitation. In this situation, a seamless writing transition from CAV method to CLV method becomes very desirable. This is called a Partial CAV recording method.

Currently, in partial CAV recording, a technique known as pseudo CLV motor speed control is typically utilized. In this technique, the motor speed control is provided while in CAV mode. The motor speed reference is gradually changed in steps according to a prescribed way to emulate CLV. In using such a technique, the ATIP address needs to be constantly monitored and the reference speed must be constantly changed, requiring additional servo overhead.

Accordingly, there is a need in the technology to overcome the aforementioned problems. There is also a need in the technology to obtain maximum recording speed efficiency without interruption during writing on a disc.

BRIEF SUMMARY OF THE INVENTION

A system and method for controlling the position of an optical head of a disc during high speed recording. In one embodiment of the method, an optical disc has a plurality of tracks. The method comprises implementing CLV recording by said optical drive, determining a wobble signal based on address information contained in said plurality of tracks of said optical disk and determining a wobble clock signal based on said wobble signal. The method further comprises decoding said wobble clock signal by a decoder, said decoder to provide a sync clock signal to an encoder loop circuit, said sync clock signal based on said wobble clock signal generating an encoder clock signal using said encoder loop circuit. In addition, the method comprises comparing said sync clock signal to said encoder clock signal to provide a position command to position the optical head of said optical drive.

DETAILED DESCRIPTION OF THE EMBODIMENTS

One aspect of the invention relates to an apparatus and method for providing high speed recording on an optical medium. In one embodiment, a tracking CLV mode motor control technique is used during recording.

Figure 1:
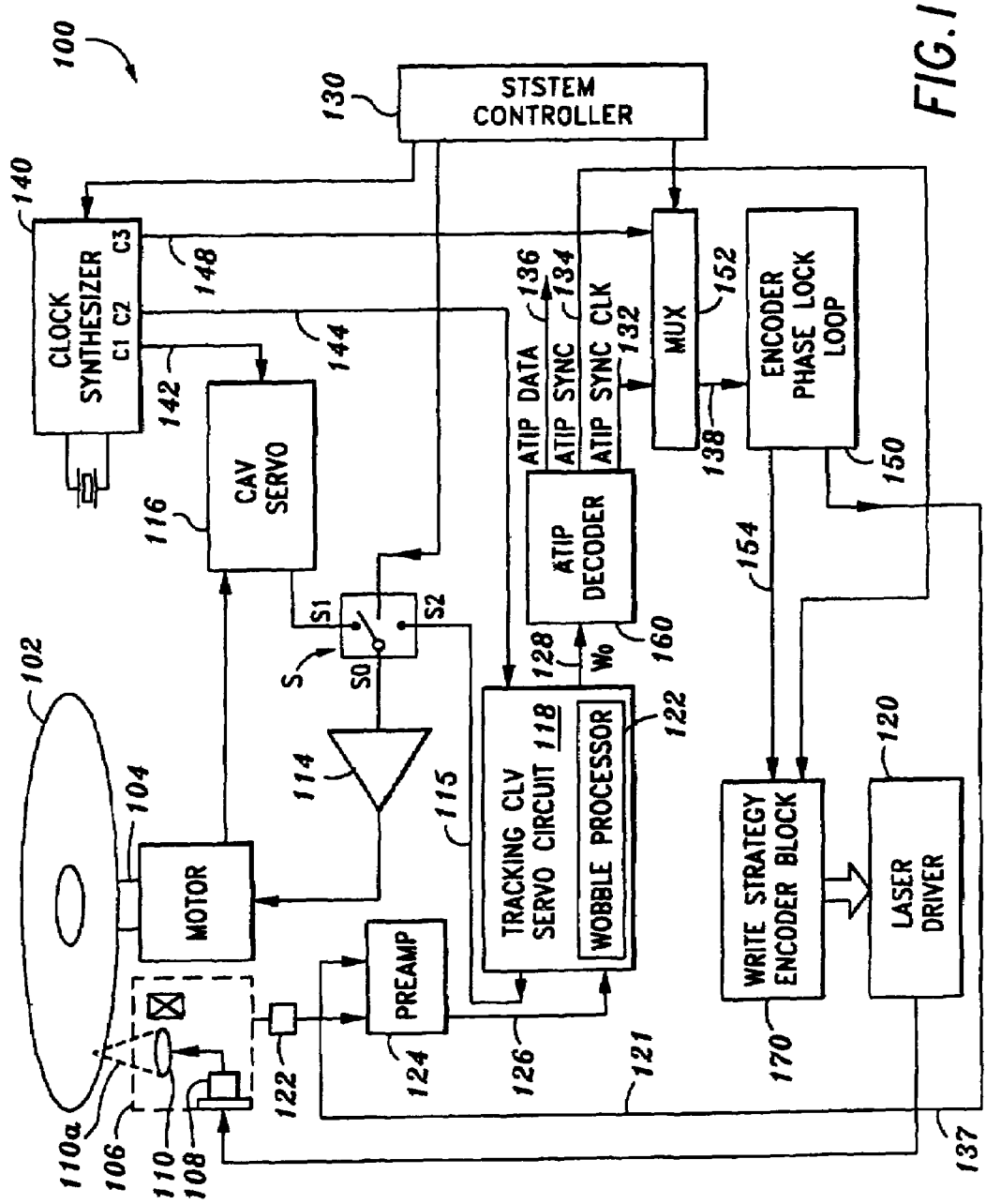
FIG. 1 illustrates one embodiment of an optical disk apparatus provided in accordance with the principles of the invention.

Referring now specifically to the figures, FIG. 1 illustrates one embodiment of an optical disk apparatus 100. The optical disk apparatus 100 includes an optical disk 102 that is rotated by a spindle motor 104. An optical pickup 106 scans the tracks on the rotating optical disk 102 with a laser beam 110a. The optical pickup 106 comprises an optical system, including a laser 108 that provides a light source and an objective lens 110. The laser 108 is driven by a laser driver 120 to emit the laser beam 110a. The laser beam 110a is incident on the objective lens 110 via optical elements (not shown) such as a collimator lens and a beam splitter. The laser beam 110a is focused on the recording surface of the optical disk 102 by the objective lens 110 to form a small spot on the recording surface.

The light reflected from the optical disk 102 propagates back to the objective lens 110 and is separated from the incident laser beam by the beam splitter (not shown). The reflected light beam may then be detected by the photodetector 122, which is able to convert the reflected light beam into electric signals. The electric signals may then provided to a preamplifier 124, which amplifies and conditions the electric signals. Based on the received electric signals, the preamplifier 124 generates a plurality of signals, including a Wobble signal (W). The Wobble signal (W) is a timing marker that also provides address information. In one embodiment, the Wobble signal (W) is a frequency modulated Frequency Shift Key signal with bi-phase coded address information called ATIP. It is understood that additional signals may be provided by the preamplifier 124.

The spindle motor 104 is rotated by motor driver 114. The motor driver 114 may be controlled by a CAV Servo circuit 116 or a tracking CLV Servo circuit 118. In one embodiment, the motor driver 114 has a terminal S0 and is coupled to switch S via terminal S0. The switch S further comprises two terminals S1 and S2. The terminals S1 and S2 are coupled to the CAV Servo circuit 116 and tracking CLV Servo circuit 118, respectively. The switch S may, under the direction of system controller 130, operate in a CAV Mode, which connects S to S1, or in a Tracking CLV Mode, which connects S0 to S2. In one embodiment, switch S is directed by the system controller 130 to connect the motor driver 114 to the CAV Servo circuit 116, by connecting S0 to S1, when the optical pickup 106 is in a seek mode. When the optical pickup 106 is positioned and ready for a write operation and a CLV recording process is selected, system controller 130 may direct switch S to couple S0 to S2, thereby connecting the motor driver 114 to the tracking CLV Servo circuit 118. Alternatively, if a CAV recording process is selected, the motor driver 114 may be coupled to the CAV Servo circuit 116.

In one embodiment, clock synthesizer 140 generates the appropriate clock signals (C1 and C2) for the CAV Servo circuit 116 and the CLV Servo circuit 118 via signal lines 142 and 144, respectively. These clock signals, C1 and C2 become the reference clocks for the CAV and CLV servo loops, respectively. The clock synthesizer 140 may also generate clock signal C3 for the Encoder Phase Lock Loop (Encoder PLL) 150, as provided via the multiplexor (MUX) 152. The system controller 130, which is coupled to the clock synthesizer 140, controls the timing of clock signals C1, C2 and C3. For example, the system controller 130 may generate C1 and C2 based on the programmed CAV and tracking CLV servo circuit 116 and 118 requirements.

When the optical pickup 106 is in motion (i.e., during the seek mode), there is no Wobble signal (W) for the Encoder PLL 150 to lock onto. However, the system controller 130 has information on the target track and the target Wobble frequency. As a result, the clock signal C3, provided to the Encoder PLL 150 via signal line 148, is selected by the system controller 130 for the Encoder PLL 150 to lock onto while the optical pickup 106 is in motion. When the optical pickup 106 is on track, the system controller 130 directs the MUX 152 to latch clock signals from ATIP Decoder 160.

When the optical pickup 106 is positioned for recording (i.e., during tracking mode), the Wobble signal (W) is provided by the preamplifer 124 to the CLV Servo circuit 118 via signal line 126. The Wobble signal (W) is further processed by the CLV Servo circuit 118 to provide a Wobble clock signal (Wo), which may then be used as the feed back signal 128 for the CLV servo loop. In one embodiment, Wo is decoded by an ATIP decoder 160 to provide ATIP Sync Clock signals via signal line 132, ATIP Sync signal via signal line 134 and ATIP data signals via signal line 136. The ATIP sync clock signals are latched into the MUX 152 under the control of system controller 130, and provided to the Encoder PLL 150. The Encoder PLL 150 generates an Encoder clock signal $C_E$ and a target Wobble center frequency signal CF. The Encoder clock signal $C_E$ is provided to a Write Strategy Encoder Block 170 via signal line 154, which also receives the ATIP sync signal from the ATIP decoder 160 via signal line 134. Based on these two signals, the Encoder Block 170 may then generate an output signal to direct the laser driver 120 to position the optical pickup 106. In addition, the target Wobble center frequency signal CF may be provided to the preamplifier 124 via signal line 137.

As will be described in more detail below, the Encoder PLL 150, while recording in either a CAV and Tracking CLV mode, may provide the basic write clock signal that is locked to the ATIP Sync clock derived by the ATIP Decoder 160 from the Wobble signal that is extracted from the disk. The ATIP decoder 160 may further include an ATIP Clock Phase Lock Loop to extract the ATIP Sync clock. In one embodiment, the ATIP Phase Lock Loop has a low pass filter to block the ATIP data and to pass the higher frequency component (such as the ATIP Sync clock). When the Wobble signal encounters defects (after the ATIP Sync clock has been filtered), the ATIP Sync clock tends to free run, and supplies a continuing ATIP Sync clock for a period corresponding to the low pass filter. For instance, at the lowest CLV speed, the wobble clock is 22.05 KHz and ATIP Sync clock is 6.3 KHz, maintaining a 3.5 to 1 ratio. The low pass filter is generally set below 4 KHz. At higher speeds, these parameters each increase proportionally. If a defect in the disk causes up to four or five wobble signals, ATIP Clock phase lock loop will lose input to the phase lock loop. However, the output of the phase lock loop will change at a rate controlled by the low pass filter and the ATIP Sync clock will supply the Sync clock for a time corresponding to the filter bandwidth. In addition, while performing either a partial or a full CLV recording operation, the same method used in the CAV mode for generating the Encoder Sync clock may also be used in a Tracking CLV mode.

Another aspect of the present invention is to use a Tracking CLV mode to control motor speed. As will be described in more detail below, the Wobble signal from the disk may be used to control the disk motor speed while in a Tracking CLV mode. To improve the speed accuracy, Automatic Phase Control loop 210 (APC) is added to the Automatic frequency Control (AFC) loop 220. When operating under the tracking CLV mode motor speed control, the Encoder PLL 150 is locked to the ATIP Sync clock and generates an Encoder clock signal for the recording process. Thus, in one embodiment, the Encoder PLL 150 may track the mechanical clock geometry on the individual disk and write data to the disk synchronously.

Figure 2:
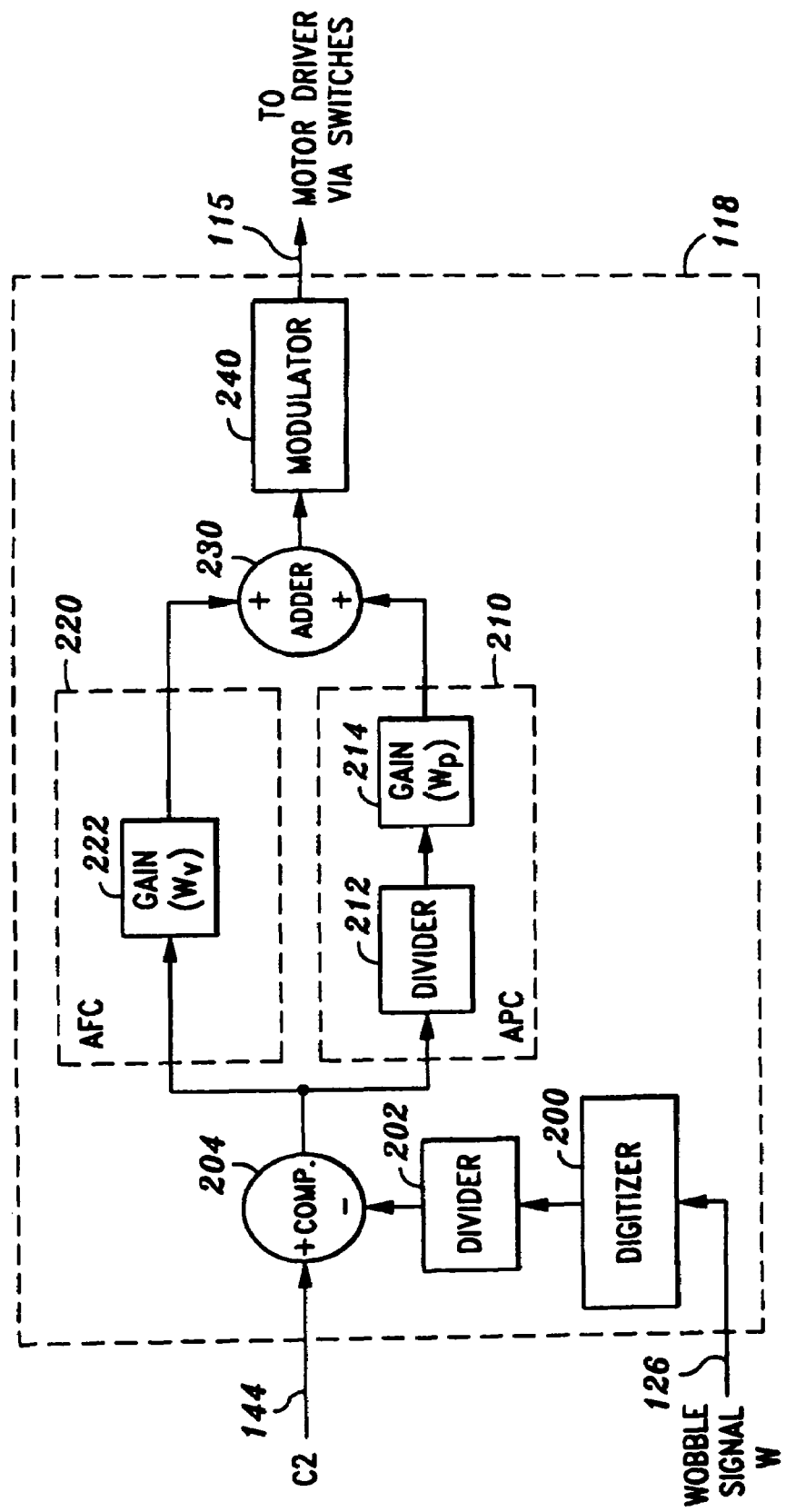
FIG. 2 illustrates one embodiment of the tracking CLV servo circuit 118 of FIG. 1.

FIG. 2 illustrates one embodiment of a detailed block diagram of the Tracking CLV Servo Circuit 118 of FIG. 1. The Tracking CLV Servo Circuit 118 receives inputs from the Clock Synthesizer 140 and the Preamplifier 124. In particular, the Tracking CLV Servo Circuit 118 receives clock signal C2 via signal line 144 from the Clock Synthesizer 140 and the Wobble signal (W) via signal line 126 from preamplifier 124. In one embodiment, the clock signal C2 operates at three times the rate of the Wobble Signal (W). The Wobble Signal (W) is first digitized by a digitizer 200 and then divided by divider 202 to provide W'. In one embodiment, W is divided by 3 so that W will match the clock rate C2. It is understood that W may be divided by any positive nonzero integer, as determined by the designer. The resulting signal W' is received by comparator 204, which also receives clock signal C2 as one input. The comparator 204 compares the signals C2 and W' and provides the resulting signal to two loops. In particular, comparator 204 provides C2 and W' to the Automatic Phase Control circuit (APC) 210 and an Automatic Frequency Control circuit (AFC) 220. The APC circuit 210 comprises a divider 212 and a Gain circuit 214, while the AFC circuit 220 comprises a gain circuit 222. In one embodiment, Wp is the gain of the APC circuit 210 while Wv is the gain for the AFC circuit 220. In one embodiment, Wp is between 6.28 and 188.4, while Wv is between 2 and 3. The divider 212 divides the incoming signal to provide a wider phase range comparison. For example, in one embodiment divider 212 uses a denominator of between 12 and 24 in dividing the incoming signal. The outputs of the APC circuit 210 and circuit 220 are added by summer 230 and provided to a modulator 240. In one embodiment, the modulator is a pulse-width modulator. The modulator modulates the summed signals and generates an output that is provided to the motor driver 114 via switch S.

One aspect of the invention involves the use of an Encoder PLL 150 to lock the Encoder clock to the Wobble signal W through the ATIP Sync clock. In one embodiment, the ATIP decoder 160 provides the Encoder PLL 150 with an ATIP Sync clock signal (AC) via signal line 132 as a dynamic reference clock. The Encoder PLL 150 multiplies clock signal (AC) by a number (Nc) to generate the Encoder clock signal ($C_E$). In one embodiment, Nc is 343. The Encoder PLL 150 can also be locked to the Wobble clock. In the latter case, clock signal (AC) has to be multiplied by 196 to generate the same Encoder Clock signal ($C_E$).

Figure 3:
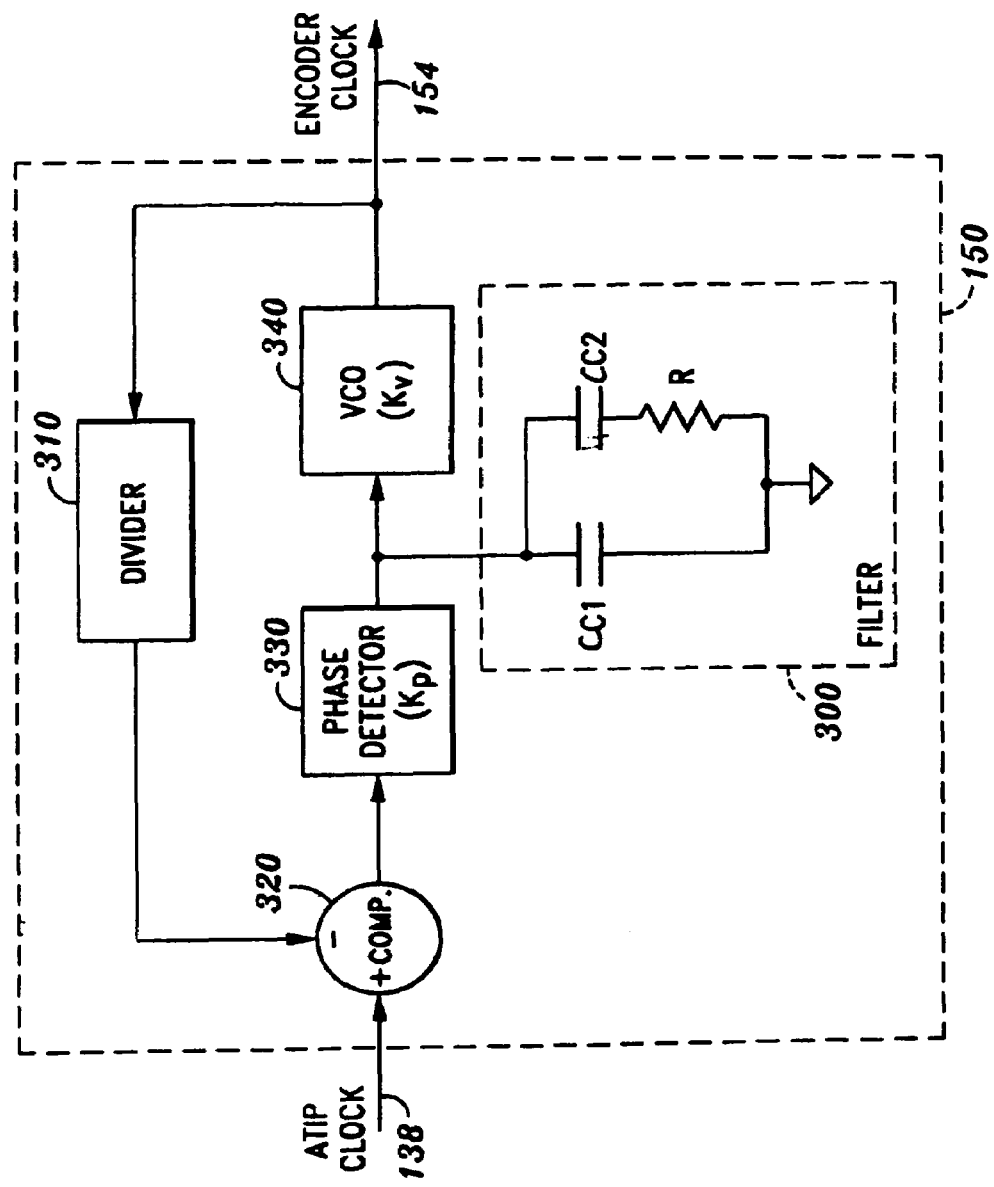
FIG. 3 illustrates one embodiment of the Encoder Phase Lock Loop of FIG. 1.

FIG. 3 illustrates one embodiment of a detailed block diagram of the Encoder PLL 150 of FIG. 1. The Encoder PLL 150 receives the ATIP clock signal (AC) via signal line 138, and generates the encoder clock signal $C_E$ as an output, where clock signal $C_E$ tracks the Wobble signal (W) on the disk. The Encoder PLL 150 comprises a filter 300, a dividing circuit 310, a comparator 320, a phase detector 330 and a variable clock oscillator (VCO) 340. In one embodiment, the filter 300 comprises capacitors CC1 and CC2, which are arranged in parallel, and resistor R which is coupled in series with capacitor CC2. In a further embodiment, the filter defines a type II PLL which has double poles at the origin, as is understood by one of skill in the art. The phase detector 330 has a gain (Kp) while the VCO 340 provides a gain (Kv). In one embodiment, Kp=(2/6.28) µA per radian, Kv=(80×6.28) M radian/volt, CC1 is 0.0027 µF, CC2 is 0.047 µF and R is 4.3 Kohms.

When operating in the Tracking CLV mode, the Encoder PLL 150 has to track the spindle motor speed and provide true Constant Linear Velocity recording regardless of any instantaneous speed variation in the disk motor. The disk motor disturbance frequency is typically under 200 Hz and thus the Encoder PLL 150 will electronically track the mechanical inaccuracies in the disk motion. Accordingly, at the start of the write mode during Tracking CLV Mode, a reference Encode Sub-code Frame Sync (ESFS) signal is phased locked with the ATIP sync clock signal. Thereafter, the ATIP Sync clock signal may only be monitored for irregularities of the disk, such as large disk defects. If a large defect occurs, the writing stops and the system skips over the defect. The recording reinitiates at the start of the next ATIP SYNC mark.

The present recording technique may also be implemented in a CAV recording process. This may be initiated by directing the switch S to connect S0 to S1, such that the system operates in the CAV servo mode, where the disk motor operates at a constant speed, while the frequency of the data recording varies. In this mode, the Encoder PLL 150 will track the ATIP sync clock, which will constantly vary as the optical head 106 moves from the inner to the outer diameter of the disk. The power of the recording write laser beam 110a depends on the writing speed N, where N is typically an integer. In a CAV recording process, the power required during the write process changes with the address in ATIP. The multi-speed media compliant disk has a linear write power requirement based on N. In one embodiment, the lowest speed occurs at N=1. A typically value of N is 48. If the CAV speed at the inner diameter is N1 and the final CAV position is N2, then the write power has to be changed linearly for the power value corresponding to N1 to the power value corresponding the N2. The power change may be updated at intervals of every 30 s or less. The following expression may be used to compute the required power level at a corresponding ATIP location:

$$N_x = KRPM * \sqrt{\frac{ATIPSS + K2}{K1}}$$

where,
$N_x$=the speed factor at the ATIP location;
ATIPSS=the ATIP in sum of seconds;
KRPM=thousands of revolutions per minute;
K1=179.14 multiplied by the stamped wobble speed as measured when initiating to write to the disk (m/s); and,
K2=1226.5625 divided by the stamped wobble speed (m/s).

If the drive components in the system are such that there is no electronic recording data rate limitation, then the drive can perform full CAV write on an entire disc. If the drive has a recording data rate limitation, then the drive may proceed with a CV recording until it reaches a point where a predetermined data rate limitation point has been reached by monitoring the ATIP address. When it reaches this point, the drive may continue writing at a tracking CLV mode without interruption in writing, maintaining a seamless write process. This type of recording is called a partial CAV recording.

One aspect of the present invention is to use a mixed mode of recording, such as a partial CAV recording mode. In one embodiment, a CAV recording process is implemented until the optical head detects an ATIP location where the data rate limit is reached, and CLV recording is desired. At this point, the switch S is coupled to terminal S2, so that the motor driver 114 is coupled to the Tracking CLV servo circuit 118. The encoder clock source is unchanged from the CAV recording mode, which tracks the mechanical motion of the disk. The mechanical disturbances which may occur while changing servo modes from CAV to Tracking CLV does not affect the timing accuracy of the encoder clock as the Encoder PLL bandwidth far exceeds the slow mechanical motion disturbances. As a result, recording is uninterrupted throughout the entire disk recording process while maximizing the time efficiency in recording.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A method comprising:
providing a partial constant angular velocity (CAV) recording mode, said partial CAV recording mode comprising:
performing a CAV recording operation, in a first operation mode, until a recording rate limit is reached;
switching a motor drive of an optical device to a second mode; and
continuing to write data in a constant linear velocity (CLV) recording operation, in the second mode, wherein the second mode further enables the CLV recording operation to synchronously write data to a disk based on tracking a mechanical geometry of the disk as it is rotated by the motor drive.

2. A method comprising:
writing data, in a first write mode, to an optical disk with an optical head of an optical recording device;
seamlessly transitioning to a second write mode in response to an internal event of the optical recording device; and
continuing to write in the second write mode, wherein the second write mode further enables synchronous writing of data to the optical disk based on tracking a mechanical geometry of the optical disk as it is rotated.

3. The method of claim 2 wherein the internal event of the optical recording device occurs when the optical head reaches an Absolute Time in Pregroove (ATIP) address on the optical disk.

4. The method of claim 3, wherein the ATIP address is an ATIP address where the optical device is writing data to the optical disk at a maximum write rate.

5. The method of claim 4, further comprising:
decoding the ATIP address from the wobble signal of the optical disk.

6. The method of claim 4, further comprising:
determining a data write rate at the present ATIP address of the optical head based on the disk rotation speed and the ATIP address;
comparing the data write rate with a predetermined maximum write rate for the optical recording device; and
initiating the mode change at the ATIP address where data write rate reaches the predetermined maximum write rate.

7. The method of claim 6, further comprising:
operating the optical recording device in the first mode over the entire disk when the data write rate does not exceed the maximum write rate at any address on the optical disk.

8. The method of claim 2 wherein the internal event of the optical recording device occurs when the optical head reaches a predetermined maximum write rate in the first write mode.

9. The method of claim 2, wherein the first mode is a constant angular velocity (CAV) recording mode, and the second mode is a constant linear velocity (CLV) recording mode.

10. The method of claim 9, further comprising:
operating the optical recording device in the first mode, wherein the first mode is a CAV recording mode;
varying the sync clock signal as the optical head of the optical recording device moves from an inner diameter to an outer diameter of the optical disk; and
tracking said sync clock signal with an encoder loop circuit.

11. The method of claim 2 further comprising:
seamlessly transitioning back to the first write mode in response to another internal event of the optical recording device.

12. An apparatus, comprising:
an operation controller to operate an optical recording device in a first and second mode; and
a system controller coupled to the operation controller to change the operation mode of the optical recording device from a first mode to a second mode in response to the operation controller sensing an event, wherein the second mode enables synchronous writing of data for recordation with the optical recording device based on tracking a mechanical geometry of a rotating disk.

13. The apparatus of claim 12, wherein the event occurs upon reaching a maximum write rate of the optical recording device.

14. The apparatus of claim 12, wherein the event occurs when the optical head of the optical recording device reaches an Absolute Time in Pregroove (ATIP) address on an optical disk.

15. The apparatus of claim 14, wherein the ATIP address is an ATIP address where the optical device is writing data to the optical disk at a maximum write rate.

16. The apparatus of claim 14, wherein the operation controller includes a first controller circuit to operate an optical recording device in a first mode, and a second controller circuit to operate an optical recording device in a second mode.

17. The apparatus of claim 16, wherein the first controller circuit is a Constant Angular Velocity (CAV) controller circuit to operate the optical recording device in a CAV recording mode, and the second controller circuit is a Constant Linear Velocity (CLV) controller circuit to operate the optical recording device in a CLV recording mode.

18. The apparatus of claim 17, wherein the system controller is to change the operation mode from the CAV recording mode to the CLV recording mode when the optical head reaches a predetermined ATIP address.

19. The apparatus of claim 18, wherein the predetermined ATIP address corresponds to an address where a maximum data write rate for the optical recording device will be reached while the optical recording device is being controlled by the CAV controller circuit.

20. The apparatus of claim 16, further comprising:
a tracking CLV circuit to receive a wobble signal from the optical head, and further to determine a wobble clock signal based on the wobble signal;
a decoder, coupled to the tracking CLV circuit, to receive the wobble clock signal and generate a sync clock signal; and
an encoder loop circuit to track the sync clock signal.

* * * * *

UNITED STATES PATENT AND TRADEMARK OFFICE
CERTIFICATE OF CORRECTION

| | | |
|---|---|---|
| PATENT NO. | : 7,577,066 B1 | Page 1 of 1 |
| APPLICATION NO. | : 11/292772 | |
| DATED | : August 18, 2009 | |
| INVENTOR(S) | : Hubert Song et al. | |

It is certified that error appears in the above-identified patent and that said Letters Patent is hereby corrected as shown below:

On Drawing sheet 1of 3, in Figure 1, Box 130, line 1, delete "STSTEM" and insert -- SYSTEM --, therefor.

In column 4, line 1, delete "preamplifer" and insert -- preamplifier --, therefor.

Signed and Sealed this

Thirteenth Day of October, 2009

David J. Kappos
*Director of the United States Patent and Trademark Office*